United States Patent [19]

Stapelbroek

[11] Patent Number: 5,148,978
[45] Date of Patent: Sep. 22, 1992

[54] COOLING MACHINE AND AN OPTIMALIZED THERMOSTATIC EXPANSION VALVE THEREFOR

[75] Inventor: Weinand A. M. Stapelbroek, Beltrum, Netherlands

[73] Assignee: Cooltronic B.V., Abbinksweg, Netherlands

[21] Appl. No.: 676,834

[22] Filed: Mar. 28, 1991

[30] Foreign Application Priority Data

Mar. 29, 1990 [NL] Netherlands ............... 9000744

[51] Int. Cl.⁵ ............... G05D 23/22; 62 225; 236 92 B; 236 68 R
[52] U.S. Cl. ............... 236/68 R; 62/225; 236/92 B
[58] Field of Search ............... 62/225; 236/92 B, 68 R

[56] References Cited

U.S. PATENT DOCUMENTS

| | | | |
|---|---|---|---|
| 2,272,099 | 2/1942 | Smith | 236/68 R X |
| 2,319,005 | 5/1943 | Lum | 62/225 X |
| 2,534,455 | 12/1950 | Koontz | 62/4 |
| 2,577,902 | 12/1951 | McGrath | 62/225 X |
| 3,464,227 | 9/1969 | Matthies | 62/225 |
| 4,171,087 | 10/1979 | Kunz | 236/68 R |
| 4,461,635 | 7/1984 | Rudebeck | 62/202 |
| 4,475,686 | 10/1984 | Huelle et al. | 236/68 C |
| 4,984,735 | 1/1991 | Glennon et al. | 62/225 X |

FOREIGN PATENT DOCUMENTS

| | | |
|---|---|---|
| 1055018 | 4/1959 | Fed. Rep. of Germany . |
| 3405313A1 | 8/1985 | Fed. Rep. of Germany . |
| 940158 | 1/1947 | France . |
| 8300819 | 10/1984 | Netherlands . |
| WO82/04142 | 11/1982 | PCT Int'l Appl. . |

*Primary Examiner*—William E. Tapolcai
*Attorney, Agent, or Firm*—Ostrolenk, Faber, Gerb & Soffen

[57] ABSTRACT

The invention relates to a cooling machine having a cooling cycle in which coolant circulates, which cooling cycle comprises:
1) an evaporator:
2) a compressor;
3) a condenser;
4) a thermostatic expansion valve whereof a bulb is connected to a coolant outlet of the evaporator; and integrating control circuit for the thermostatic expansion valve, comprising:
   a liquid-sensitive sensor placed in the cooling cycle for direct contact with coolant and connected via a voltage source to a heating element with which the bulb can be heated, and to a thermostatic expansion valve therefor.

10 Claims, 1 Drawing Sheet

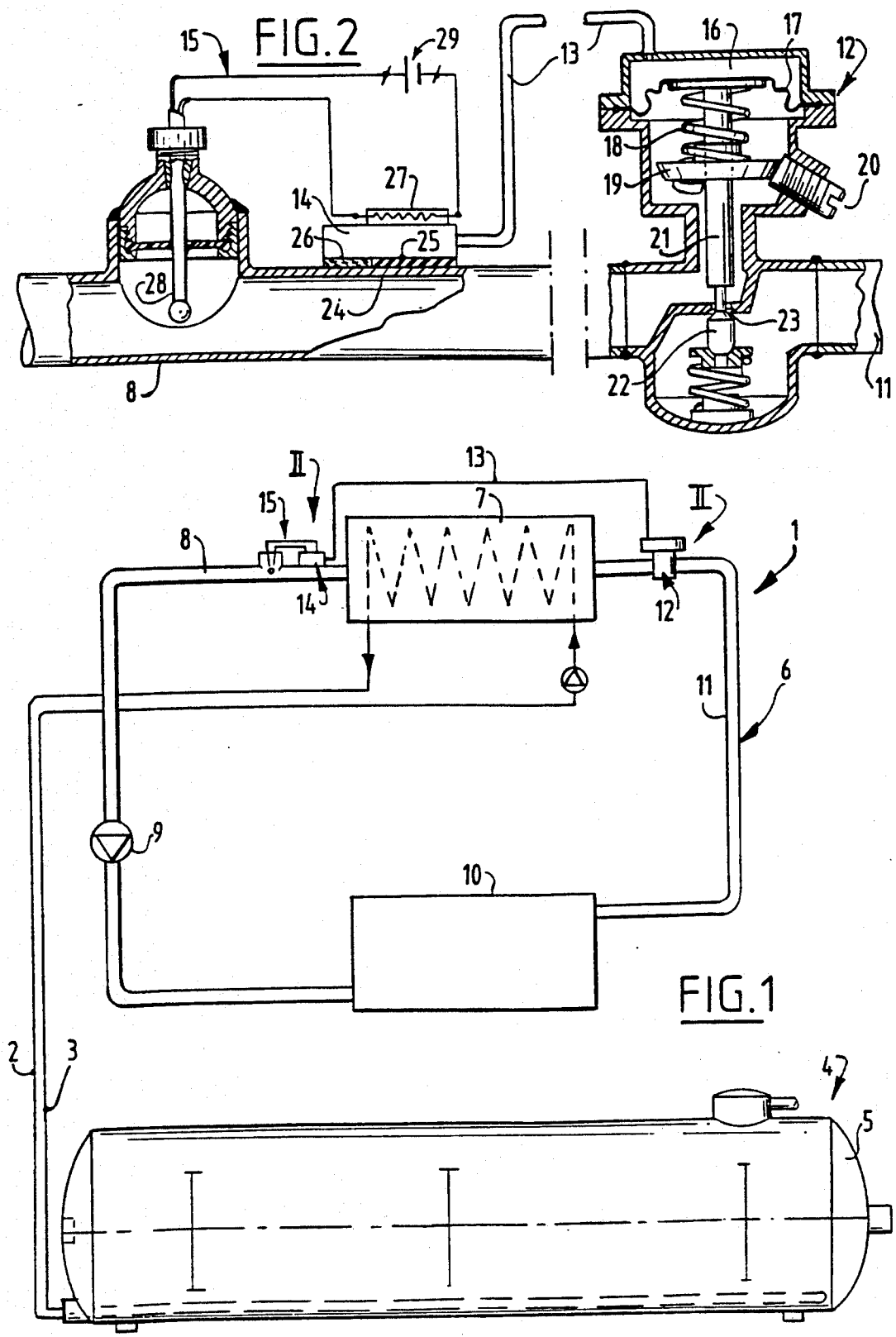

COOLING MACHINE AND AN OPTIMALIZED THERMOSTATIC EXPANSION VALVE THEREFOR

The present invention relates to a thermostatic expansion valve and a cooling machine of which the cooling cycle is provided with such a thermostatic expansion valve.

A thermostatic expansion valve comprises a bulb filled with a liquid-vapour mixture connected via a capillary conduit to a pressure chamber of the valve provided with a membrane. The bulb is fixed to the outlet of the evaporator (suction conduit of the compressor) and measures the temperature, and indirectly the pressure, of the coolant leaving the evaporator. The bulb pressure is exerted on the membrane and, depending on the counter pressure, the thermostatic expansion valve is opened to a greater or lesser extent. It is thus possible to compensate for a variation in the cooling capacity of the evaporator.

In practice the temperature of the coolant gas leaving the evaporator is higher than the evaporating temperature and this difference is called superheating. In conventional cooling machines wherein use is made of a thermostatic expansion valve, about 10% of the evaporator surface is used to heat the coolant gas above boiling point. This relatively great superheating is necessary to provide a stably controlled cooling cycle since the conventional thermostatic expansion valve is a valve regulated proportionally to the superheating control signal coming from the evaporator. At a low superheating this control signal is disturbed by the presence of liquid in the still superheated coolant gas.

WO-82/04142 describes a cooling machine wherein the bulb of the thermostatic expansion valve can be heated with a heating element subject to the temperature difference over the evaporator measured with two temperature sensors. Such a measuring system has the drawback that the degree of superheating is not corrected for the pressure fall of the coolant over the evaporator, this pressure difference depending on the load of the evaporator (at a low evaporator load the pressure fall is greater). No information can thus be obtained with this temperature difference measurement relating to the state of the coolant on the outlet side of the evaporator.

US-A-3,478,543 describes a cooling system wherein a thermistor which is in direct coolant contact in the outlet of the evaporator is electrically connected to the membrane of the expansion valve so that the expansion valve can be controlled by heating this membrane. This case does not involve a thermostatic expansion valve and there is the further drawback that if the thermistor fails the operation of the cooling machine can no longer be controlled.

The invention has for its object to provide a cooling machine and an optimalized thermostatic expansion valve therefor wherein the degree of superheating is corrected for the load-dependent pressure difference over the evaporator. The control circuit applied therein is moreover of simpler construction and if the control circuit fails a basic control remains ensured using the thermostatic expansion valve, be it at a less than optimal superheating.

This object is achieved according to the invention with a cooling machine having a cooling cycle in which coolant circulates, which cooling cycle comprises:

1) an evaporator;
2) a compressor;
3) a condenser;
4) a thermostatic expansion valve whereof a bulb is connected to a coolant outlet of the evaporator; and
5) integrating control circuit for the thermostatic expansion valve, comprising:
   a liquid-sensitive sensor placed in the cooling cycle for direct contact with coolant and connected via a voltage source to a heating element with which the bulb can be heated.

If in preference the liquid-sensitive sensor inside the evaporator makes direct contact with the coolant, it is ensured that no liquid coolant is fed to the compressor and a fixed value for the superheating can further be obtained under all load conditions for the evaporator. This latter situation is achieved by setting the thermostatic expansion valve to a fixed superheating (using the setting screw) at the smallest cooling load of the evaporator. During setting the integrating control circuit is temporarily interrupted. The thermistor is then attached at that position in the evaporator where the coolant transposes from liquid to gas. After re-connection of the integrating control circuit the thermostatic expansion valve according to the invention ensures that in the evaporator the coolant is present in the control circuit as cooling liquid up to the liquid-sensitive sensor and is present as gas after passing the sensor.

An upper and lower limit for the superheating under all load conditions in the evaporator is obtained by setting a determined value to be selected for the superheating (lower limit) at the smallest cooling load of the evaporator using the setting screw, wherein the control circuit is temporarily switched off. By subsequently arranging the liquid-sensitive sensor in a part of the evaporator filled with liquid coolant the integrating control circuit will ensure that, if gaseous coolant is formed at this location as a result of greater superheating, under all load conditions the cooling cycle in the evaporator is once again filled with liquid coolant at least up to this position. It will be apparent that the distance of the liquid-sensitive sensor, which is arranged in the evaporator itself, to the bulb arranged on the suction conduit to the compressor together with the setting of the expansion valve using the setting screw determines the degree of superheating and the lower and upper limits for the superheating in the evaporator.

According to another embodiment the liquid-sensitive sensor inside the evaporator outlet is in direct contact with the coolant. The degree of superheating of the evaporator can thus be minimalized since the control is now such that the coolant is present in the cooling cycle as liquid up to the liquid-sensitive sensor and thereafter as gas.

In both embodiments the heat supplied with the heating element to the bulb by means of the control circuit is controlled by the liquid-sensitive sensor and not as according to the prior art by a signal consisting of a difference between the temperature measured at the output of the evaporator and the temperature at the intake of the evaporator. The degree of superheating must in any case also be corrected for the lowering of the boiling point as a result of the load-dependent pressure difference over the evaporator.

In the cooling system according to WO-82/04142 low superheatings, and certainly a superheating equal to 0° C., are not possible. In the known cooling system the superheating will be at least equal to the pressure difference over the evaporator. Further drawbacks of these known systems are that the temperature sensors have to be fixed to the control circuit lines thereby resulting in a control delay, and the sensors must further be insulated, whereby they become sensitive to the surrounding temperature and other possible disturbances.

Such an integrating thermostatic expansion valve is very stable and only requires setting once. Since operation can take place at low superheating, higher evaporation temperatures are possible when the products for cooling have the same temperatures. This not only results in energy and time saving but also in less rapid icing and prevents problems arising from ice deposition. In addition the product for cooling will dry out less quickly. By optimally utilizing the evaporator surface area a more balanced cooling of the product and a more balanced frosting of the cooling elements will also occur.

The control circuit according to the invention is moreover failsafe, that is, should the control circuit cease to function the expansion valve continues to act as a thermostatic expansion valve, albeit at a higher superheating and a lower evaporating temperature. The cooling operation of the cooling machines is not interrupted.

Finally, it is possible to embody existing thermostatic expansion valves with such a control circuit according to the invention.

In order to measure the ratio of coolant gas to coolant liquid in the outlet of the evaporator the control circuit makes use of a liquid-sensitive sensor. Use is preferably made for such a sensor of an NTC-resistor, a thermistor.

It is favorable for a stable control circuit that the time constant of the bulb is increased. This can be carried out in simple manner by reducing the heat conducting surface between the bulb and the outlet of the evaporator. According to the invention this is achieved in that the contact surface of the bulb with the outlet of the evaporator is partially provided with a thermal insulation.

In the stable control circuit according to the invention the temperature of the coolant leaving the evaporator is not of importance for the liquid-sensitive sensor. This sensor in any case reacts to the ratio of coolant gas to coolant liquid at a determined evaporation/condensation temperature.

Mentioned and other features of the thermostatic expansion valve according to the invention and a cooling machine in which such a valve is incorporated will be described hereinafter by way of illustration on the basis of a nonlimitative embodiment, wherein reference is made to the annexed drawing.

IN THE DRAWING

FIG. 1 is a schematic illustration of a cooling machine according to the invention for cooling a milk tank; and FIG. 2 shows on a larger scale and partly in section the details II and III of FIG. 1.

FIG. 1 shows a cooling machine 1 connected via conduits 2 and 3 to a cooling tank 4 for the purpose of cooling the content thereof, for example milk 5.

The cooling machine 1 comprises a cooling cycle 6 with an evaporator 7 which is connected via a coolant outlet 8 to the suction side of a compressor 9. The delivery side of compressor 9 is connected to a condenser 10 which is connected to the evaporator 7 via a duct 11 incorporating an expansion valve 12.

The expansion valve 12 is connected via a capillary conduit 13 to a bulb 14 fixed for thermal conduction to the outlet 8. Bulb 14 is further provided with a control circuit 15 according to the invention which will be discussed hereinbelow in more detail with reference to FIG. 2.

The conventional thermostatic expansion valve 12 comprises a pressure chamber 16 with a membrane 17 against which presses a spring 18 which rests on a spring cup 19. The spring pressure is adjustable with a setting screw 20 which sets the position of the spring cup 19 along a guide pin 21. The position of the needle valve 22 which regulates the opening 23 of the thermostatic expansion valve 12 is determined by the pressure in the pressure chamber 16. This pressure is proportional to the pressure of the liquid-vapour mixture in bulb 14. This pressure depends on the temperature of the coolant flowing through the outlet 8.

The contact surface 24 of the bulb 14 with outlet 8 is partially thermally insulated with a thermal insulation material 25. The remaining portion of the contact surface 24 is provided with a thermally conducting material 26.

Further arranged against bulb 14 is a heating element 27 wherewith the bulb 14 can be heated. This heating element 27 is incorporated in the control circuit 15 which further comprises a thermistor 28 extending into the outlet 8 and a voltage source 29.

The operation of the integrating control circuit 15 for the thermostatic expansion valve 12 is as follows. The thermistor 28 is in direct contact with the coolant leaving the evaporator 7 via outlet 8. If the coolant consists only of coolant gas, the thermistor 28 is then heated, whereby its resistance declines, the flow in the control circuit 15 increases and the bulb 14 is heated by the heating element 27. The pressure in the pressure chamber 16 thereby increases and the opening 23 of the expansion valve 12 is enlarged and coolant liquid flows to the evaporator 7. The feed of coolant liquid to the evaporator 7 is first lessened when the thermistor 28 records an increasing quantity of coolant liquid in the outlet 8. Its resistance increases and as a result of a decreased flow in the control circuit 15 bulb 14 is heated less, whereby the pressure in pressure chamber 16 decreases and the opening 23 into the inlet 11 for the evaporator 7 becomes smaller.

Thus formed is a proportionally integrating control circuit for the thermostatic expansion valve which is very stable and the evaporator 7 can therefore operate continuously under more temperate superheating conditions.

By making use of the control circuit 15 according to the invention it is possible to considerably reduce the extent of superheating of evaporator 7 for the cooling machine 1. In an experiment wherein, as shown in FIG. 1, 1,000 liters of milk were cooled from roughly 15° C. to roughly 4° C. the degree of superheating was found to fall within half an hour from 6.8° to 3.7° C. with use of the control circuit according to the invention, whereafter the degree of superheating remained constant during the remaining part of the cooling process. Without the control circuit according to the invention the initial superheating was 15.5° C., which at the end of the process after three hours had fallen to only 7.9° C.

Although not described, it is possible to incorporate a controllable resistor in the control circuit 15 in order to enable adjustment of the extent of superheating of evaporator 7. The pressure can further be limited with pressure sensors and the evaporation temperature with a thermostat.

Although not described as embodiment, it will be apparent as according to FIGS. 1 and 2 to transfer the liquid-sensitive sensor from the outlet of evaporator 7 into the coolant duct passing through evaporator 7. The position inside the evaporator 7 is selected depending on the desired degree of superheating, as is described in more detail hereinbefore.

I claim:

1. Cooling machine having a cooling cycle in which coolant circulates, the cooling cycle comprising:
   1) an evaporator;
   2) a compressor;
   3) a condenser;
   4) a thermostatic expansion valve including a bulb thermally connected to a coolant outlet of the evaporator;
   5) an integrating control circuit for the thermostatic expansion valve, the integrating control circuit comprising:
      a liquid sensitive sensor placed in the cooling cycle in direct contact with coolant, the sensor being connected via a voltage source to a heating element for heating the bulb; and
   6) a thermal insulator located between the bulb and the coolant outlet for partially thermally insulating the bulb.

2. Cooling machine as claimed in claim 1, wherein the liquid-sensitive sensor is inside the evaporator in direct contact with the coolant.

3. Cooling machine as claimed in claim 1, wherein the liquid-sensitive sensor is inside the evaporator outlet in direct contact with the coolant.

4. Cooling machine as claimed in claim 1, wherein the liquid-sensitive sensor is a thermistor.

5. The cooling machine as claimed in claim 1, wherein the liquid-sensitive sensor is placed in the cooling cycle for direct contact with the coolant such as to sense whether the coolant is in a liquid or gaseous state.

6. The cooling machine as claimed in claim 1, wherein the liquid-sensitive sensor is placed in the cooling cycle for direct contact with the coolant at a position at which the coolant normally transitions from the liquid to the gaseous state.

7. Thermostatic expansion valve for a cooling machine, the valve comprising a bulb connected to a pressure chamber of the valve and thermally connected to a coolant outlet of an evaporator, the bulb including a heating element connected to a voltage source and a liquid-sensitive sensor in a control circuit, and a thermal insulator located between the bulb and the coolant outlet for partially thermally insulating the bulb, wherein the liquid-sensitive sensor is in direct contact with circulating coolant.

8. Valve as claimed in claim 7, wherein the liquid-sensitive sensor is a thermistor.

9. The valve as claimed in claim 7, wherein the liquid-sensitive sensor is placed in the cooling machine in direct contact with the circulating coolant such as to sense whether the coolant is in a liquid or gaseous state.

10. The valve as claimed in claim 7, wherein the liquid-sensitive sensor is placed in the cooling machine in direct contact with the circulating coolant at a location where the coolant normally transitions from the liquid to the gaseous state.

* * * * *